Patented July 5, 1932

1,866,500

UNITED STATES PATENT OFFICE

EDWARD T. HOWELL, OF MILWAUKEE, WISCONSIN, ASSIGNOR, BY MESNE ASSIGNMENTS, TO E. I. DU PONT DE NEMOURS & COMPANY, A CORPORATION OF DELAWARE

CAUSTIC FUSION OF BENZANTHRONE COMPOUNDS

No Drawing. Application filed August 15, 1931. Serial No. 557,379.

This invention relates to caustic fusion of benzanthrone compounds. More particularly, this invention relates to caustic potash fusions of benzanthrone, dibenzanthronyl, or their substitution derivatives, to give the corresponding dibenzanthrone.

In German Patent No. 185,221, is described a method of preparing dibenzanthrone by fusing benzanthrone directly with caustic potash.

In German Patent No. 290,079, it is claimed that the above reaction is facilitated and the product considerably improved as to purity if the fusion is carried out in the presence of neutral substances such as naphthalene or in the presence of organic bases such as aniline or pyridine.

Various other diluents or inert media have been suggested in the art.

I have now found that if the caustic fusion of benzanthrone or dibenzanthronyl compounds is carried out in the presence of a diaryl amine, the product is further improved to a remarkable degree both as to purity and as to tinctorial yield.

It is accordingly an object of this invention to facilitate the caustic fusion of benzanthrone and related compounds, whereby the purity of the product as well as its tinctorial value are considerably increased.

Other and further important objects of this invention will become apparent as the description proceeds.

I accomplish my objects above set forth by effecting the caustic fusion in the presence of a diaryl amine, such as diphenyl or ditolyl amine.

Other inert or basic compounds may be present in the reaction mass. For instance, I may add naphthalene or sodium acetate.

I may apply my invention to benzanthrone itself or to its substitution derivatives (other than those substituted in the peri positions), such as methyl-benzanthrone or methoxy-benzanthrone.

I may also apply my process to the fusion of 2, 2'-dibenzanthronyl or Bz1, Bz1'-dibenzanthronyl or their substitution derivatives to produce the corresponding dibenzanthrone body.

The following examples will serve further to illustrate my invention, but it will be understood that the same are merely illustrative, not limitative. Parts mentioned are parts by weight.

*Example 1.*—50 parts of benzanthrone (M. P. 168–170° C.) are added to 400 parts of molten diphenylamine at a temperature of about 60 to 65° C. with stirring. 100 parts of ground caustic potash are added, the mixture is heated gradually to 175° C. and held at about 175 to 180° C. for a period of about 4 hours while stirring. The reaction mass is now cooled to about 60° C., poured into 1000 parts of cold water, and air is blown through the mixture until the dyestuff is completely precipitated. The diphenylamine also crystallizes out and precipitates with the dyestuff. After filtering, washing and drying, the dyestuff may be separated from the diphenylamine by extracting the latter with a solvent such as alcohol. The dyestuff thus obtained consists of dibenzanthrone in exceptionally good yield and in a high state of purity.

The diphenylamine may be recovered from the extraction solvent by fractional distillation.

*Example 2.*—100 parts of benzanthrone (M. P. 168–170° C.) and 100 parts of caustic potash (flakes) are added to 400 parts of molten diphenylamine at a temperature of 60 to 65° C., while stirring. The mass is heated gradually to about 175° C., and stirred at 175–180° C. for about 2 hours. The fusion mass is now cooled to about 60° C.; 400 parts of a petroleum distillate fraction of boiling range 157 to 206° C. are added; and the mass is filtered at about 65° C. The filter cake is washed at room temperature with the same petroleum fraction, sucked dry, then digested in cold water, aerated until completely precipitated, and steam distilled to remove traces of the petroleum fraction. It is now again filtered, washed with water, dried, and then again washed with alcohol to remove alcohol-soluble impurities. The product thus obtained consists of dibenzanthrone, and its yield, based on tinctorial value, is 25% greater than the yield obtained by following the procedure of German Patent No. 290,079, above referred to.

*Example 3.*—66 parts of benzanthrone (M. P. 168-170° C.) and 100 parts of caustic potash (flakes) are added to 400 parts of molten diphenylamine at a temperature of 60 to 65° C. The mass is slowly heated to 150° C., and held at this temperature with stirring for 4 hours. The fusion mass is now worked up as in Example 2. The final product consists of dibenzanthrone in substantially the same yield and of substantially the same quality as in Examples 1 and 2, in spite of the lower fusion temperature employed in the present instant.

*Example 4.*—50 parts of a mixture of β-monomethyl-benzanthrones (consisting most probably of a mixture of 3-, 6-, and 7-methyl-benzanthrones and obtainable, for instance, by reacting the reduction product of β-methyl-anthraquinone with glycerine and removing any 2-methyl-benzanthrone formed by fractional crystallization from a solvent), and 50 parts of caustic potash (flakes) are added to 400 parts of diphenylamine at a temperature of 60 to 65° C. The mass is heated gradually to about 175° C., and held at 175 to 180° C. with stirring for about 2 hours. The fusion mass is then worked up as in Example 2. The ultimate product consists of a mixture of dimethyl-dibenzanthrones in good yield and high purity. It dyes cotton a much more greenish shade of blue than dibenzanthrone.

*Example 5.*—25 parts of purified Bz1, Bz1'-dibenzanthronyl and 37.5 parts of caustic potash (flakes) are added to 125 parts of molten diphenylamine at a temperature of 60 to 65° C. The mass is heated slowly to 175° C., and held at 175 to 180° C., while stirring, for a period of about 1 hour. The product may be isolated as in Example 2, and consists of dibenzanthrone in extraordinarily pure state.

*Example 6.*—25 parts of 2, 2'-dibenzanthronyl are added to 150 parts of molten diphenylamine at a temperature of 60 to 65° C., and 50 parts of caustic potash (flakes) are introduced. The mass is heated to about 175° C., and stirred at 175 to 180° C. for about 2 hours. The fusion mass is worked up according to either of Examples 1 and 2. The product consists of dibenzanthrone in an exceptionally high state of purity.

While I have indicated above specific conditions of several modes of carrying out my invention, many variations are possible without departing from the spirit of this invention, as will be readily understood by those skilled in the art. Thus, instead of diphenylamine, ditolylamine, or other diarylamines may be used. Instead of caustic potash, a mixture of caustic soda and caustic potash may be used. The temperature of fusion may be varied within wide limits, as is generally practiced in fusions of this type.

In the claims below it should be understood that by the term "a compound of the benzanthrone family" I mean to cover and include benzanthrone, dibenzanthronyl, and the substitution derivatives of either.

I claim:

1. In the process of fusing a compound of the benzanthrone family having free peri positions, with caustic alkali to produce a dibenzanthrone compound, the improvement which comprises effecting the fusion in the presence of a diaryl-amine.

2. In the process of fusing a benzanthrone body having free peri positions, with caustic potash to produce the corresponding dibenzanthrone, the improvement which comprises effecting the fusion in the presence of a compound selected from the group consisting of diphenyl-amine and ditolylamine.

3. In the process of fusing a dibenzanthronyl body having free peri positions, with caustic potash to produce the corresponding dibenzanthrone, the improvement which comprises effecting the fusion in the presence of a diaryl-amine.

4. In the process of fusing Bz1, Bz1'-dibenzanthronyl with caustic potash to produce dibenzanthrone, the improvement which comprises effecting the fusion in the presence of a compound selected from the group consisting of diphenyl-amine and ditolyl-amine.

5. In the process of fusing 2, 2'-dibenzanthronyl with caustic potash to produce dibenzanthrone, the improvement which comprises effecting the fusion in the presence of a compound selected from the group consisting of diphenyl-amine and ditolyl-amine.

6. The process which comprises heating a compound of the benzanthrone family having free peri positions, with a caustic alkali in the presence of a diaryl-amine, extracting the diaryl-amine with an organic solvent and recovering the dibenzanthrone compound.

7. The process which comprises heating a benzanthrone body having free peri positions with caustic potash in the presence of a compound of the diphenylamine series, until the formation of the corresponding dibenzanthrone body, extracting the diphenylamine compound with an organic solvent, and recovering the dibenzanthrone body.

8. The process which comprises heating a dibenzanthronyl body having free peri positions, with caustic potash in the presence of a compound of the diphenylamine series, until the formation of the corresponding dibenzanthrone body, extracting the diphenylamine compound with an organic solvent, and recovering the dibenzanthrone body.

9. The process which comprises heating Bz1, Bz1'-dibenzanthronyl with caustic potash in the presence of a compound of the diphenylamine series, until the formation of dibenzanthrone, extracting the diphenylamine compound with an organic solvent, and recovering the dibenzanthrone.

10. The process which comprises heating 2, 2'-dibenzanthronyl with caustic potash in the presence of a compound of the diphenylamine series, until the formation of dibenzanthrone, extracting the diphenylamine compound with an organic solvent, and recovering the dibenzanthrone.

In testimony whereof, I have hereunto subscribed my name at Carrollville, in the county of Milwaukee, and State of Wisconsin.

EDWARD T. HOWELL.